US008510179B2

(12) United States Patent
Kahlon et al.

(10) Patent No.: US 8,510,179 B2
(45) Date of Patent: *Aug. 13, 2013

(54) INVENTORY TRANSACTION COMMON OBJECT

(75) Inventors: Paramjit Kahlon, San Mateo, CA (US); Nardo B. Catahan, Jr., S. San Francisco, CA (US); Shailendra Garg, Sunnyvale, CA (US); Maria Theresa Barnes-Leon, Fremont, CA (US); Ramaswamy Sundararajan, Cupertino, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1208 days.

This patent is subject to a terminal disclaimer.

(21) Appl. No.: 10/696,371

(22) Filed: Oct. 28, 2003

(65) Prior Publication Data
US 2007/0214065 A1    Sep. 13, 2007

Related U.S. Application Data

(60) Provisional application No. 60/457,359, filed on Mar. 24, 2003.

(51) Int. Cl.
*G06Q 10/00* (2012.01)
(52) U.S. Cl.
USPC ............................................................ 705/28
(58) Field of Classification Search
USPC ................................................................ 705/28
See application file for complete search history.

(56) References Cited

U.S. PATENT DOCUMENTS

| | | | |
|---|---|---|---|
| 4,714,995 A | 12/1987 | Materna et al. | 364/200 |
| 5,220,500 A | 6/1993 | Baird et al. | 705/36 R |
| 5,311,438 A | 5/1994 | Sellers et al. | 700/96 |
| 5,349,643 A | 9/1994 | Cox et al. | 380/25 |
| 5,416,917 A | 5/1995 | Adair et al. | 707/203 |
| 5,446,880 A | 8/1995 | Balgeman et al. | 707/9 |
| 5,566,332 A | 10/1996 | Adair et al. | 707/101 |
| 5,646,862 A | 7/1997 | Jolliffe et al. | 703/1 |
| 5,699,527 A | 12/1997 | Davidson | 705/38 |
| 5,708,828 A * | 1/1998 | Coleman | 715/205 |
| 5,724,575 A | 3/1998 | Hoover et al. | 707/10 |
| 5,727,158 A | 3/1998 | Bouziane et al. | 709/225 |

(Continued)

FOREIGN PATENT DOCUMENTS

| | | |
|---|---|---|
| JP | 2001 256308 | 9/2001 |
| WO | WO 0143031 A1 | 6/2001 |
| WO | WO 01/88759 A1 | 11/2001 |
| WO | WO 03/003641 A2 | 1/2003 |

OTHER PUBLICATIONS

Cross Access, Introduces SERIESfour; Offers Native, Fast, Scalable Legacy Data Connectivity for Data Marts, ERP Applications, pp. 1-3, Jan. 18, 1999. Downloaded from: http://proquest.umi.com/pqdweb?index=20&did=38255217&SrchMode=1&sid=1&Fmt=3&VInst=PROD&VType=PQD&RQT=309&VName=PQD&TS=1203710049&clientId=19649.*

(Continued)

*Primary Examiner* — Paul Danneman
(74) *Attorney, Agent, or Firm* — Campbell Stephenson LLP

(57) ABSTRACT

Stored inventory transaction information in a first format for use by a first computerized system is transformed to readily make the stored inventory transaction information available for use in a second computerized system that utilizes a second format in a cost-efficient and time-efficient manner.

33 Claims, 23 Drawing Sheets

(56) References Cited

U.S. PATENT DOCUMENTS

| | | | | |
|---|---|---|---|---|
| 5,742,588 | A | 4/1998 | Thornberg et al. | 370/236 |
| 5,758,355 | A * | 5/1998 | Buchanan | 707/201 |
| 5,764,543 | A | 6/1998 | Kennedy | 703/2 |
| 5,806,075 | A * | 9/1998 | Jain et al. | 1/1 |
| 5,930,156 | A | 7/1999 | Kennedy | 703/6 |
| 5,930,764 | A | 7/1999 | Melchione et al. | 705/10 |
| 5,953,710 | A | 9/1999 | Fleming | 705/38 |
| 5,970,490 | A | 10/1999 | Morgenstern | 707/10 |
| 5,983,194 | A | 11/1999 | Hogge et al. | 705/7 |
| 6,032,136 | A | 2/2000 | Brake et al. | 705/41 |
| 6,053,947 | A | 4/2000 | Parson | 703/14 |
| 6,167,380 | A | 12/2000 | Kennedy et al. | 705/10 |
| 6,178,418 | B1 * | 1/2001 | Singer | 707/3 |
| 6,182,053 | B1 | 1/2001 | Rauber et al. | 705/28 |
| 6,216,130 | B1 | 4/2001 | Hougaard et al. | 707/10 |
| 6,226,649 | B1 | 5/2001 | Bodamer et al. | 707/104.1 |
| 6,233,566 | B1 | 5/2001 | Levine et al. | 705/36 R |
| 6,236,997 | B1 | 5/2001 | Bodamer et al. | 707/10 |
| 6,275,812 | B1 | 8/2001 | Haq et al. | 705/11 |
| 6,336,124 | B1 | 1/2002 | Alam et al. | 715/523 |
| 6,341,289 | B1 | 1/2002 | Burroughs et al. | 707/104.1 |
| 6,343,275 | B1 | 1/2002 | Wong | 705/26 |
| 6,377,952 | B1 | 4/2002 | Inohara et al. | 707/101 |
| 6,385,620 | B1 | 5/2002 | Kurzius et al. | 707/104.1 |
| 6,434,567 | B1 | 8/2002 | De La Huerga | 707/102 |
| 6,463,430 | B1 | 10/2002 | Brady et al. | 707/3 |
| 6,546,387 | B1 | 4/2003 | Triggs | 707/5 |
| 6,556,950 | B1 | 4/2003 | Schwenke et al. | 702/183 |
| 6,569,207 | B1 | 5/2003 | Sundaresan | 715/234 |
| 6,591,260 | B1 | 7/2003 | Schwarzhoff et al. | 702/2 |
| 6,631,382 | B1 * | 10/2003 | Kouchi et al. | 707/102 |
| 6,668,253 | B1 | 12/2003 | Thompson et al. | 707/10 |
| 6,681,223 | B1 | 1/2004 | Sundaresan | 707/6 |
| 6,738,975 | B1 | 5/2004 | Yee et al. | 719/310 |
| 6,754,679 | B2 | 6/2004 | Oheda | 707/201 |
| 6,778,651 | B1 | 8/2004 | Jost et al. | 379/201.01 |
| 6,792,431 | B2 | 9/2004 | Tamboli et al. | 707/102 |
| 6,826,542 | B1 | 11/2004 | Virgin et al. | 705/34 |
| 6,826,568 | B2 | 11/2004 | Bernstein et al. | 707/6 |
| 6,828,963 | B1 | 12/2004 | Rappoport | 345/419 |
| 6,883,004 | B2 | 4/2005 | Bahl et al. | 707/10 |
| 6,889,260 | B1 * | 5/2005 | Hughes | 709/246 |
| 6,898,783 | B1 | 5/2005 | Gupta et al. | 717/105 |
| 6,912,719 | B2 * | 6/2005 | Elderon et al. | 719/319 |
| 6,944,514 | B1 | 9/2005 | Matheson | 700/98 |
| 6,947,947 | B2 | 9/2005 | Block et al. | 707/102 |
| 6,961,760 | B2 | 11/2005 | Li et al. | 709/219 |
| 6,996,776 | B1 | 2/2006 | Makely et al. | 715/207 |
| 7,013,485 | B2 | 3/2006 | Brown et al. | 726/27 |
| 7,043,687 | B2 | 5/2006 | Knauss et al. | 715/236 |
| 7,062,540 | B2 | 6/2006 | Reddy et al. | 709/217 |
| 7,065,499 | B1 | 6/2006 | Seth et al. | 705/26 |
| 7,085,729 | B1 | 8/2006 | Kennedy et al. | 705/10 |
| 7,093,200 | B2 | 8/2006 | Schreiber et al. | 715/835 |
| 7,099,350 | B2 | 8/2006 | Peterson | 370/465 |
| 7,111,010 | B2 | 9/2006 | Chen | 707/102 |
| 7,111,077 | B1 | 9/2006 | Starkovich et al. | 709/246 |
| 7,124,112 | B1 | 10/2006 | Guyan et al. | 705/44 |
| 7,133,882 | B1 | 11/2006 | Pringle et al. | 1/1 |
| 7,139,766 | B2 | 11/2006 | Thomson et al. | 707/101 |
| 7,143,100 | B2 | 11/2006 | Carlson et al. | 707/101 |
| 7,162,540 | B2 | 1/2007 | Jasen et al. | 709/242 |
| 7,257,594 | B2 | 8/2007 | Tamboli et al. | 701/101 |
| 7,257,820 | B2 | 8/2007 | Fischer et al. | 719/316 |
| 7,287,041 | B2 | 10/2007 | Barnes-Leon et al. | 707/104.1 |
| 7,337,192 | B2 | 2/2008 | Stark et al. | 707/104.1 |
| 7,349,861 | B1 | 3/2008 | Fischer et al. | 705/7 |
| 7,370,009 | B1 | 5/2008 | Notani et al. | 705/26 |
| 7,412,404 | B1 | 8/2008 | Tenorio | 715/236 |
| 7,680,818 | B1 | 3/2010 | Fan et al. | 707/999.103 |
| 2001/0011245 | A1 | 8/2001 | Duhon | 705/38 |
| 2001/0051907 | A1 | 12/2001 | Kumar et al. | 705/36 |
| 2002/0007343 | A1 | 1/2002 | Oyama et al. | 705/39 |
| 2002/0019765 | A1 | 2/2002 | Mann et al. | 705/11 |
| 2002/0023004 | A1 | 2/2002 | Hollander et al. | 705/22 |
| 2002/0035431 | A1 | 3/2002 | Ell | 702/5 |
| 2002/0035488 | A1 | 3/2002 | Aquila et al. | 705/4 |
| 2002/0040339 | A1 | 4/2002 | Dhar et al. | 705/38 |
| 2002/0085020 | A1 | 7/2002 | Carroll, Jr. | 345/700 |
| 2002/0095456 | A1 | 7/2002 | Wensheng | 709/203 |
| 2002/0116234 | A1 | 8/2002 | Nagasawa | 705/5 |
| 2002/0123983 | A1 | 9/2002 | Riley et al. | 707/1 |
| 2002/0133510 | A1 | 9/2002 | Lau | 707/203 |
| 2002/0138582 | A1 | 9/2002 | Chandra et al. | 709/206 |
| 2002/0169863 | A1 | 11/2002 | Beckwith et al. | 709/223 |
| 2002/0169867 | A1 | 11/2002 | Mann et al. | 709/224 |
| 2002/0174417 | A1 | 11/2002 | Sijacic et al. | 717/147 |
| 2002/0178077 | A1 | 11/2002 | Katz et al. | 705/26 |
| 2002/0184085 | A1 | 12/2002 | Lindia et al. | 705/11 |
| 2002/0184148 | A1 | 12/2002 | Kahn et al. | 705/40 |
| 2002/0188538 | A1 | 12/2002 | Robertson et al. | 705/35 |
| 2003/0014440 | A1 | 1/2003 | Bussert et al. | 715/239 |
| 2003/0018502 | A1 | 1/2003 | Rodriguez | 705/7 |
| 2003/0023580 | A1 | 1/2003 | Braud et al. | 703/3 |
| 2003/0033437 | A1 | 2/2003 | Fischer et al. | 709/310 |
| 2003/0051047 | A1 * | 3/2003 | Horel et al. | 709/237 |
| 2003/0071852 | A1 | 4/2003 | Stimac | 345/810 |
| 2003/0088442 | A1 * | 5/2003 | Michael et al. | 705/3 |
| 2003/0097642 | A1 | 5/2003 | Arai et al. | 716/1 |
| 2003/0110104 | A1 | 6/2003 | King et al. | 705/28 |
| 2003/0131018 | A1 | 7/2003 | Godoy et al. | 707/104.1 |
| 2003/0163597 | A1 | 8/2003 | Hellman et al. | 709/316 |
| 2003/0163603 | A1 | 8/2003 | Fry et al. | 709/328 |
| 2003/0229529 | A1 | 12/2003 | Mui et al. | 705/8 |
| 2004/0002982 | A1 | 1/2004 | Ersek et al. | 1/1 |
| 2004/0015515 | A1 | 1/2004 | Beisiegel et al. | 707/103 Y |
| 2004/0034661 | A1 | 2/2004 | Barron et al. | 707/104.1 |
| 2004/0039576 | A1 | 2/2004 | He et al. | 705/1 |
| 2004/0093351 | A1 | 5/2004 | Lee et al. | 707/104.1 |
| 2004/0122826 | A1 | 6/2004 | Mackie | 707/100 |
| 2004/0128188 | A1 | 7/2004 | Leither et al. | 705/11 |
| 2004/0162773 | A1 | 8/2004 | Del Rey et al. | 705/36 |
| 2004/0215503 | A1 | 10/2004 | Allpress et al. | 705/11 |
| 2004/0249854 | A1 | 12/2004 | Barnes-Leon et al. | 703/103 Y |
| 2005/0021383 | A1 | 1/2005 | Fliess et al. | 705/8 |
| 2005/0021391 | A1 | 1/2005 | Lu et al. | 705/11 |
| 2005/0091249 | A1 | 4/2005 | Hanson et al. | 707/101 |
| 2005/0160361 | A1 | 7/2005 | Young | 715/513 |
| 2005/0197880 | A1 | 9/2005 | Walsh et al. | 705/8 |
| 2006/0271446 | A1 | 11/2006 | Barnes-Leon et al. | 705/26 |
| 2007/0033531 | A1 | 2/2007 | Marsh | 715/738 |
| 2007/0203710 | A1 | 8/2007 | Habichler et al. | 705/1 |
| 2007/0208577 | A1 | 9/2007 | Barnes-Leon et al. | 705/1 |
| 2007/0208878 | A1 | 9/2007 | Barnes-Leon et al. | 709/246 |
| 2007/0214020 | A1 | 9/2007 | Srinivasan et al. | 705/4 |
| 2007/0214063 | A1 | 9/2007 | Kahlon et al. | 705/28 |
| 2007/0214064 | A1 | 9/2007 | Kahlon et al. | 705/28 |
| 2007/0214065 | A1 | 9/2007 | Kahlon et al. | 705/28 |
| 2007/0225949 | A1 | 9/2007 | Sundararajan et al. | 703/2 |
| 2007/0226037 | A1 | 9/2007 | Garg et al. | 705/1 |
| 2007/0226049 | A1 | 9/2007 | Muralitharan et al. | 705/11 |
| 2007/0226093 | A1 | 9/2007 | Chan et al. | 705/38 |
| 2007/0250408 | A1 | 10/2007 | Barnes-Leon et al. | 707/100 |
| 2007/0250419 | A1 | 10/2007 | Kumar et al. | 705/34 |
| 2007/0265944 | A1 | 11/2007 | Catahan, Jr. et al. | 705/30 |

OTHER PUBLICATIONS

Kappelhoff, Ralph, Integration of ERP to the final control elements. ISA Transactions, vol. 36, No. 4, pp. 229-238, 1998. Downloaded from http://www.sciencedirect.com/science?_ob=MImg&imagekey=B6V3P-3T5NTC8-2-1&_cdi=5736&_user=2502287&_orig=browse&_coverDate=12%2F31%2F1997&_sk=999639995&view=c&wchp=dGLbVzz-zSkWW&md5=0350fbf28172f7261f24674c7fbc2e.*

Hardwick, Martin, Sharing Manufacturing Information in Virtual Enterprises. Communication of the ACM, vol. 39, Issue, pp. 46-54, Feb. 1998. Down loaded from: http://delivery.acm.org/10.1145/240000/230803/p46-hardwick.pdf?key1=230803&key2=1368073021&coll=GUIDE&dl=GUIDE&CFID=56170646&CFTOKEN=78167776.*

"Cross Access Introduces SERIESfour; Offers Native, Fast, Scalable Legacy Data Connectivity for Data Marts, ERP Applications," PR Newswire; New York; Jan. 18, 1999; pp. 1-3. Downloaded from http://proquest.umit.com.

Hardwick, Martin, David L. Spooner, Rom Rando, and K.C. Morris, "Sharing Manufacturing Information in Virtual Enterprises;" Communication of the ACM; vol. 39, No. 2; Feb. 1996; pp. 46-54. Downloaded from http://delivery.acm.org.

Kappelhoff, Ralph, "Integration of ERP to the Final Control Elements;" ISA Transactions; 1998; vol. 36, No. 4; pp. 229-238. Downloaded from http://www.sciencedirect.com.

Nori, Anil K. et al., "Bringing Objects to the Mainstream," Compcon Proceedings, IEEE San Jose, California, Feb. 23-26, 1997, pp. 136-142.

PTC: Siebel Systems and PTC create strategic alliance to leverage entriched ifnormation across product development, sales and service; Combination of Siebel eBusiness Applications and PTC Collaborative Product Development solutions to deliver competitive advantage, M2 Presswire, Conventry: Jan. 24, 2002, 3 pages (retrieved from ProQuest.com).

Wilson, J.R., "Aerospace Looks for Lift from e-commerce," Intervia, Geneva, Jul./Aug. 2001; vol. 56, Issue 655, 6 pages (retrieved from ProQuest.com).

XML/EDI Group. "Guidelines for using XML for Electronic Data Interchange." Presented at XML One—San Jose, Sep./Oct. 2001. Downloaded from http://web.archive.org/web/20040413182700/http://www.xmledi-group.org/.

NPL_XML_Schema_CE.pdf, A tutorial published by the SML governing body of w3.org regarding the use of SML Schemas and Complex Data Elements. Downloaded on Jun. 10, 2009 from http://www.w3schools.com/Scheme/schema_intro.asp? and http://www.w3schools.com/Schema/schema_complex.asp? and http://www.w3.schools.com/Schema/schema_complex_empty.asp?;7 pages.

Routledge et al., UML and XML Schema, 2002, pp. 1-10.

Walter J. Savitch, Java an Introduction to Computer Science & Programming, 2000, p. 478.

Walter J. Savitch, Java an Introduction to Computer Science & Programming, 2000, pp. 458-467.

Walter J. Savitch, Java an Introduction to Computer Science & Programming, 2000, p. 1.

"Fortis Investments Implements Unified Employee Management System Across 12 Countries" (Business Wire, Jul. 2004).

"Extract simplifies file conversion" Software Markets, Dec. 2, 1991. Retrieved via Dialog on Aug. 16, 2010.

Cover pp. "Siebel's Universal Application Network" Apr. 8, 2002 downloaded from xml.coverpages.org May 6, 2010.

Cover pp. "Siebel Announces Success with Universal Application Network (UAN)" Apr. 21, 2004 downloaded from xml.coverpages.org May 6, 2010.

Michael Kay, Editor "XSL Transformations (XSLT) Version 2.0 W3C Working Draft 2 May 2003" downloaded from http://www.w3.org/TR/2003/WD-xslt20-20030502/ May 6, 2010.

Eric Gropp "Transforming XML Schemas" Jan. 15, 2003, downloaded from xml.com May 6, 2010.

Sonic Software Corporation, Power Schemas With Stylus Studio' Jan. 2004.

Ohlhorst, Frank J., "ScanSoft's OmniForm Fills Bill for Forms-Driven Customers," CRN; Jericho: Feb. 17, 2003, Issue 1033; p. 51 (1 page).

Seminerio, Maria, "Job Agencies Will Hire HR-XML—Protocol Promises a Lingua Franca for Resumes;" eWeek; Jan. 1, 2001; vol. 18, Issue 1; p. 45.

Anonymous; CambridgeDocs Releases xDoc SML Converter; Information Today; Mar. 1, 2001; vol. 20, Issue 3; p. 49.

Anonymous; "HR-XML Consortium Sponsors Panel Discussion/Demonstrates Draft Protocol at IHRIM Conference and Expo;" Business Wire; Jun. 28, 2000; 4 pages.

* cited by examiner

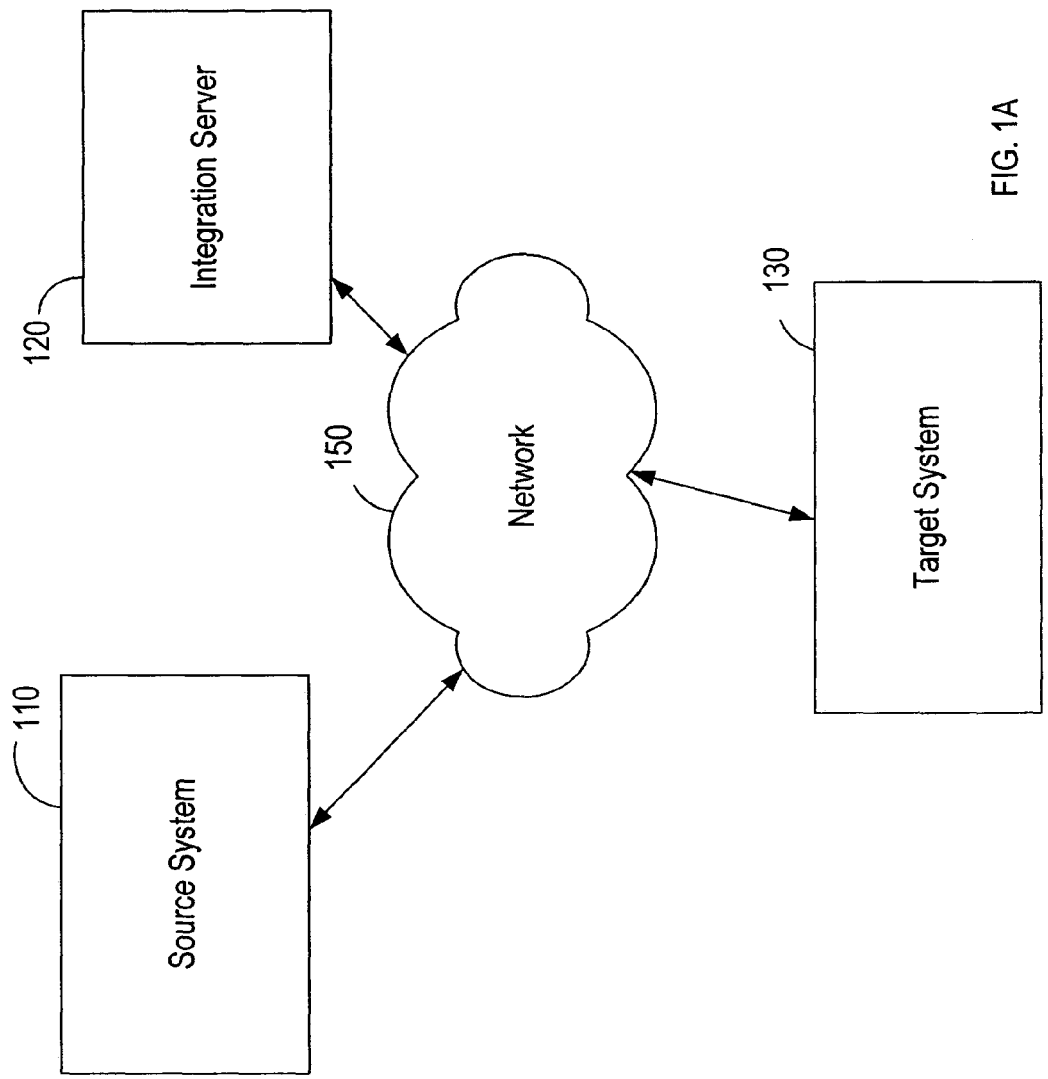

INVENTORY TRANSACTION COMMON OBJECT

CROSS REFERENCE TO RELATED APPLICATIONS

This application claims the benefit of U.S. Provisional Patent Application No. 60/457,359 filed Mar. 24, 2003, entitled, "INVENTORY TRANSACTION SYNCHRONIZATION AND COMMON OBJECT," by Kahlon et al., and which is hereby incorporated by reference in its entirety.

TECHNICAL FIELD

The present invention is directed to the field of data modeling in the context of enterprise resources planning, supply chain management, warehouse management, and customer relations management, and more specifically to inventory management.

BACKGROUND

Manufacturers and suppliers of products use back-office computerized systems to provide support for functions in enterprise resources planning (ERP), supply chain management (SCM) and warehouse management (WMS). Such functions include manufacturing, marketing, inventory control, procurement and financing.

Also available are front-office computerized systems, which provide support to product vendors and distributors. In the context of inventory management, such front-office functions include analysis of historical customer demand for products, stocking and replenishment of inventory, and providing information resources for delivery of inventory and service to consumers. In order to take advantage of such front-office software computerized systems, their users typically must store data in forms usable by the front-office computerized system, which often differ significantly from the forms usable with back-office computerized systems.

Thus, when some or all aspects of inventory are managed by both back-office and front-office computerized systems, there is a need to synchronize the inventory information in both computerized systems. Generally, in order for front-office computerized systems to communicate with back-office computerized systems that are already being used, the user must manually regenerate data from the back-office computerized systems in forms usable by the front-office computerized systems, and vice versa. Such manual regeneration has several significant disadvantages, including: (1) it is often expensive; (2) it often requires a substantial amount of time to complete; (3) it must be repeated each time data changes in either the back-office system or the front-office system; and (4) it is prone to errors.

In view of the foregoing, an automated approach for transforming data used by a back-office computerized system for use by a front-office computerized system, and vice versa, is needed.

BRIEF DESCRIPTION OF THE DRAWINGS

FIG. 1A is a high level network diagram showing aspects of a computerized environment in which the facility operates, according to certain embodiments.

DETAILED DESCRIPTION

Figure 1B:
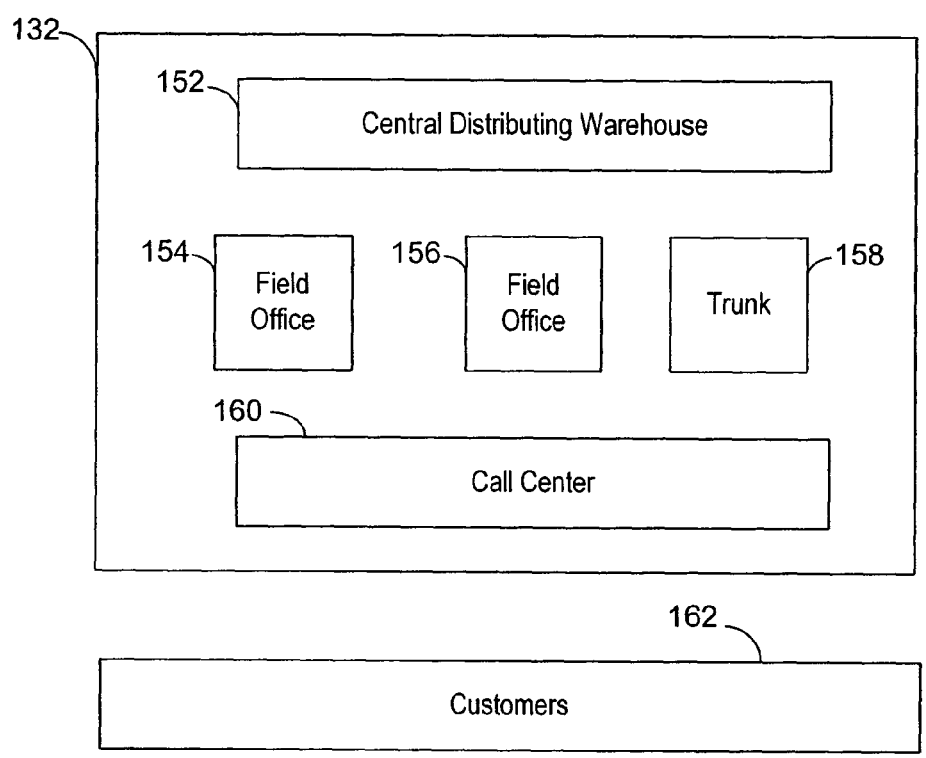
FIG. 1B is a block diagram that illustrates some business components of a front-office system 132, according to certain embodiments.

According to certain embodiments, the synchronization of inventory information addresses the needs of a company and its partners, which deploy multiple computer applications, obtained from multiple vendors of computer applications, in the company's inventory management system. The synchronization operation provides a user of the inventory management system the same view of the inventory information across the various computer applications. All changes in the inventory information need to be captured and made accessible to all relevant computer applications in the inventory management system. For example, when an inventory item is received into inventory, shipped for an order, or has a change in its availability status (such as "reserved" status from "on hand" status), such inventory information need to be captured and made accessible to relevant computer applications in the inventory management system.

For purposes of explanation, assume that a company's inventory management system includes a front-office system for customer interfacing operations. Further, assume that the company's inventory management system also includes a back-office system that includes an inventory cost accounting application, for example. The computer applications of the front-office system uses a data model that is distinct from the data model used in back-office system's computer applications.

Inventory items are physically stored in a central distribution warehouse, at a field service office, in one or more field service engineer's trunk, or at a third party vendor's location. Assume that the various computer applications associated with inventory management used by the central distribution warehouse, the field service office, the field service engineer, and the third party vendor, are part of the front-office system. An inventory cost accounting application, for example, from the back-office system will need to share inventory information with the front-office system computer applications. Thus, a common data storage model is needed so that the various computer applications across the company's inventory management system can share the inventory information.

When a front-office call center receives an order from a customer, the call center can commit the availability of inventory parts and labor to the customer even though such inventory parts are stocked by different partners across a multiplicity of systems, only if the call center and the multiplicity of systems share inventory information. An important type of inventory information that needs to be shared across the systems is inventory transaction information. Thus, any inventory transaction information that occurs in the front-office needs to be synchronized with that of the back-office, and vice versa. Some examples of inventory transactions are shown in Table 1, herein, according to certain embodiments.

TABLE 1

| # | Transaction Type | Description | Triggers IAP |
|---|---|---|---|
| 1 | Receive from Third Party | Parts receipt from third party inventory location | Synchronize Inventory Transaction |
| 2 | Ship to Third Party | Parts moved between an owned inventory location and a third party location | Synchronize Inventory Transaction |
| 3 | Adjustment | Parts balance changes as result of Cycle Count | Synchronize Inventory Transaction |
| 4 | Allocate | Part moves from "on hand" status to "reserved" for same location | Synchronize Inventory Transaction |
| 5 | De-Allocate | Part moves from "reserved" status to "on hand" for same location | Synchronize Inventory Transaction |
| 6 | Stock Transfer | Parts moved between any two inventory location types | Synchronize Inventory Transaction |
| 7 | Over-the-counter | Parts moved between a warehouse and trunk inventory | Synchronize Inventory Transaction |
| 8 | Receive Other | Inventory transaction between any inventory location type and an external location | Synchronize Inventory Transaction |
| 9 | Ship Other | Inventory transaction between any inventory location type and external location | Synchronize Inventory Transaction |
| 10 | Ship Internal | Ship parts to an internal location | Synchronize Inventory Transaction |
| 11 | Receive Internal | Receive parts from an internal location | Synchronize Inventory Transaction |
| 12 | Exchange between FSEs | Move parts between two trunk inventory locations | Synchronize Inventory Transaction |

By ensuring that all the relevant systems in the enterprise have the same view of inventory transaction information, there is a seamless integration of inventory processes across all applications to maintain data integrity. Such data integrity with respect to inventory allows the front-office call center to check for inventory availability, to reserve and ship the inventory, etc. Another aspect of data integrity with respect to inventory is the integration of real-time consumption data.

Thus, when all systems within the enterprise have a consistent and accurate view of the inventory information, then improvements in the following business aspects are possible:
  Reduced spare parts inventory
  Improved service delivery
  Improved service assurance
  Reduced dock space and labor to move product into reserve slots
  Increase inventory turns and just-in-time deliveries
  Transfer of ownership to suppliers (supplier consigned inventory on-site or direct deliveries)
  Service reporting highlights unusual backorders
  Line-item fill rates
  Order fill rates to be used for analysis of underlying reason
  Number of backorders and measure incomplete orders
  System on-hand equals actual on-hand Inventory transaction information records the movement of inventory items across inventory locations or, within an inventory location, across inventory levels. Inventory level is also known as a product bucket. Inventory level is a classification of a stock keeping unit, based on its availability code and status code. A stock keeping unit is an instance of a product (part number) at an inventory location. An example of a stock keeping unit is "30 GB Hard Drive" at "Chicago Field Office". Examples of availability codes are "on hand-good", or "on hand-defective", or "customer owned-good", etc. Every inventory transaction in the system updates the balances in the inventory location master for the product being transacted. As previously explained with reference to TABLE 1, there may be many different types of Inventory transactions.

The inventory transaction of type "Allocate" will trigger the reservation of inventory against an order. The Allocate transaction occurs at order entry time when a customer calls the front-office call center to request additional inventory items (service/sales order). The call center representative will check the inventory (available-to-transact, i.e., if the inventory items are available on the shelf). If the requested quantity of inventory items is available in inventory, then the requested quantity of inventory items will be "reserved" for that order. The act of reserving a quantity of inventory items for an order is referred to as "allocate transaction", hereafter. Such allocate transactions will need to be synchronized with the back-office system so that the correct quantity of inventory (for available-to-transact and reserved) is reflected in both the front-office and back-office systems.

The allocate transaction may also originate in the back-office. Internal Orders (orders that transfer inventory between two inventory locations within a company, for e.g., from a warehouse to a field office) are created in the back-office. After an internal order is created in the back-office, the back-office system will designate the status of the requested quantity of inventory items to the "reserved" status. The reserved status information with respect to this particular requested quantity of inventory items need to be updated in the front-office application because these particular inventory items are no longer available to be allocated against a customer order in the front-office.

The allocate transaction information includes information on the source location name, the product being allocated, the quantity of product being allocated, condition of the product being allocated (good/defective), and the order number against which the product is being allocated.

Another type of inventory transaction is a "pick transaction". A pick transaction includes date and time, order number(s), part number, storage location (to the bin level) of the part, and location delivery information. The term "part(s)" is synonymous with "inventory item(s)", herein. Pick tickets are generated as part of the order fulfillment process. The order management process uses the mechanism of pick tickets to notify warehouse personnel that an order has been created and that such an order requires a specific group of parts to be shipped to the customer. For example, after the parts have been allocated against a customer order, a pick ticket is created and sent to the storage location that has such parts on reserve. A warehouse clerk (picker) receives the pick ticket and physically pulls the parts listed in the pick ticket, and moves such parts to the packaging/shipping area. The pick list on the pick ticket is sorted in the order in which a picker would navigate the inventory location. For example, the picker may navigate "aisle 1" then "aisle 4" then "aisle 5", etc. of the inventory location. Various route optimization routines for sorting the items on a pick list may be used. Such optimization routines may vary from implementation to implementation.

Another type of inventory transaction is the "stock transfer" inventory transaction. The stock transfer inventory transaction may occur in either the front-office inventory system or the back-office inventory system.

The stock transfer occurs when inventory items are pulled from one inventory location (source location) and are transferred to another inventory location (destination location). The source location and the destination location are usually in the vicinity of each other so that there is very little lag in time between when the inventory items leave the source location and when it arrives at the destination location.

The information in a stock transfer transaction includes the source location name, the specific product, the quantity of inventory items transferred, the condition (good/defective) of the inventory item, and the destination location. If the inventory item is serialized, then an asset/serial number may be specified for the inventory transaction to commit in either the front-office or back-office inventory system. The number of assets specified is equal to the quantity field in the inventory transaction. If the inventory item is being transferred to a customer (as in the case of a POS—point of sale—system), then the destination inventory location is designated as "External Location."

Yet another type of inventory transaction is the inventory "receipt transaction." When inventory items are ordered from either an internal location or third party vendor, an inventory receipt transaction occurs when the inventory items arrive at the designated warehouse. The receipt transaction can occur at either the front-office inventory system or the back-office inventory system. When inventory items are received, the receiving clerk physically counts the quantity of inventory items received, notes the order number against which the inventory items are received, and notes the condition of the inventory items upon receipt. According to certain embodiments, the receive transaction in the front-office inventory system triggers synchronization with the back-office inventory system. According to certain embodiments, there may be three types of receive transactions: 1) "Receive from Third Party", 2) "Receive Internal", 3) "Receive Other". Any of the above three types of receive transactions can trigger a synchronization of the inventory transaction information between the front-office inventory system and the back-office inventory system.

Another type of inventory transaction is the inventory "shipping transaction". The information with respect to the shipping of inventory items to customers are synchronized between the front-office inventory system and the back-office inventory system. Such synchronization occurs after the Pick of the inventory items for a specific order has been completed, and after the inventory items for that specific order have been consolidated and packed. A shipment can contain inventory items from several pick tickets. It is possible for several shipments to be created for a single order. Thus, shipping documentation may be created at the order header or at line item level, for example.

Another type of inventory transaction is the inventory "adjustment transaction". The inventory adjustment transaction occurs when an inventory administrator notices a discrepancy between the inventory balances that are recorded in the system versus the actual inventory balance. In response to such a discrepancy, an inventory adjustment transaction is made to correct the discrepancy. There may be multiple reasons for the discrepancy between the recorded inventory balance and the actual inventory balance. One reason may be the shrinkage resulting from inventory items being lost in transit, being scrapped, being stolen, etc. Thus, inventory adjustment transactions may be made at periodic intervals as result of the cycle count transaction. Also, inventory adjustment transactions may occur during an inventory audit.

According to certain embodiments, the inventory adjustment transaction includes the source location name, the product, the quantity adjusted, the condition (good/defective) of the product, and the destination location (for accounting purposes). If the product is serialized, then an asset/serial number can be specified for the inventory adjustment transaction to commit in inventory system (both back-office and front-office inventory systems). The number of assets specified is equal to the quantity field in the inventory transaction.

Inventory transactions can be bi-directional. In other words, inventory transactions can be initiated from either the front-office inventory system or the back-office inventory system. When an inventory transaction is initiated, it returns a status of either success or failure. In case of failure, appropriate error handling procedure can be performed.

The following illustrates the process by which the allocate transaction is initiated and generated in the front-office inventory system and then the allocate transaction is synchronized with the back-office inventory system. Such a synchronization is needed so that the correct quantity of inventory that is available-to-transact or that is reserved is reflected in both systems.

Assume that the call center receives an order from customer X, for 25 GB hard drive. The call center representative enters the order for customer X. The call center representative uses the front-office inventory system to specify a line item of 25 GB Hard Drive and activates the locate functionality on the line item screen. The locate functionality displays that a 25 GB Hard Drive is available in the Chicago Field Office. The inventory system's part locator engine knew that customer X was located in Chicago and was associated with the Chicago Field Office.

The call center representative informs Customer X that the 25 GB Hard Drive is available. The call center representative "allocates" the 25 GB Hard Drive line item and marks the order as Urgent. The call center representative reviews the shipping address and information with Customer X and tells Customer X that the order will be shipped to the Customer X from the Chicago field office according to the shipping method specified by Customer X. Next, the call center representative activates the picket ticket functionality on the order screen to generate a pick ticket that notifies the Chicago Field Office users that they need to send the order to Customer X. When the call center representative generates the allocate transaction in the front-office inventory system to reserve the 25 GB Hard Drive for Customer X, a corresponding transaction is sent to the Integration server to notify the back-office inventory system that the 25 GB Hard Drive has been put on reserve. Thus, the correct quantity of inventory that is available for further orders and that which is on reserve is reflected in both the front-office inventory system and the back-office inventory system.

The following illustrates the process by which the allocate transaction is initiated and generated in the computerized back-office inventory system and then the allocate transaction is synchronized with the computerized front-office inventory system, according to certain embodiments of the invention.

Assume that the manager (Mr. M) of the company's central warehouse in Dallas uses an enterprise resource planning (ERP) system to manage inventory and warehouse operations. The ERP system is the back-office system for this example. One of Mr. M's responsibilities is to ensure that enough spare parts (inventory items) are available at the field offices across the country to provide desired service levels to regional customers. Assume that when a service order cannot be sourced from a regional field office, the service order is sourced from the company's Central Warehouse. It is Mr. M's objective to ensure that the majority of service orders are sourced from regional field offices so that his company can provide prompt response to its customers and meet service level agreements. Further assume that the field offices are using a computerized front-office inventory system. Mr. M uses the front-office inventory system to monitor the inventory levels across the field offices. Assume that Mr. M notices that the Chicago field office is running low on 25 GB Hard Drives for AIX servers. Mr. M uses the replenishment process in the front-office inventory system in order to generate an internal order from the Dallas central warehouse to the Chicago field office. At such time, an application service interface (ASI) is invoked to transmit that order to the ERP system (back-office inventory system) at the Dallas Central Warehouse.

Next, Mr. M uses the ERP application to reserve, via the allocate transaction, the requested quantity of 25 GB Hard Drives. Mr. M also generates a pick ticket at the Dallas central warehouse. When the allocate transaction is committed in the ERP application, the inventory integration server receives an allocate transaction message. This allocate transaction message is transmitted to the front-office inventory system and an appropriate allocate transaction is generated in the front-office inventory system database. Thus, the correct quantity of inventory that is available for further orders and that which is on reserve is reflected in both the front-office inventory system and the back-office inventory system.

A software facility (hereafter "the facility") for automatically converting inventory transaction information, is described. In some embodiments, the facility converts inventory transaction information from a form used by the source system to a form used by the target system. In certain embodiments, back-office systems are those that provide support for such functions as manufacturing, marketing, inventory control, procurement and financing. In certain embodiments, front-office system are those that provide support for such functions as analysis of historical customer demand for products, stocking and replenishment of inventory, and providing information resources for delivery of inventory and service to consumers, and sales. It is to be noted that the passage of inventory transaction information can be bi-directional. In other words, inventory transaction information can be passed from the back-office inventory system to the front-office inventory system or vice versa. When inventory transaction information is passed from the back-office inventory system to the front-office inventory system, then the back-office inventory system is referred to as the source system and the front-office inventory system is referred to as the target system. On the other hand, when inventory transaction information is passed from the front-office inventory system to the back-office inventory system, then the front-office inventory system is referred to as the source system and the back-office inventory system is referred to as the target system.

In some embodiments, such as embodiments adapted to converting inventory transaction information in the first source format, the facility converts inventory transaction information by converting the inventory transaction information that is in the first source format into an intermediate format. The intermediate format is then used to convert the inventory transaction information into the target format.

By performing such conversions, embodiments of the facility enable a user of a first computerized system who has stored inventory transaction information in a first format for use by the first computerized system to readily make the stored inventory transaction information available for use in a second computerized system that utilizes a second format in a cost-efficient and time-efficient manner.

FIG. 1A is a network diagram showing aspects of a typical hardware environment in which the facility operates. FIG. 1A shows a source system 110, a target system 130, an integration server 120 and a network 150. Source system 110 stores inventory transaction information in a source format. There may be more than one source system. Target system 130 stores inventory transaction information in a target format. There may be more than one target system.

The facility (not shown) converts some or all inventory transaction information that is in the source format into the target format by using an intermediate format of the inventory transaction information. In certain embodiments, such conversions are performed with the aid of one or more other computer systems, such as integration server system 120. Components of the facility may reside on and/or execute on any combination of these computer systems, and intermediate results from the conversion may similarly reside on any combination of these computer systems.

The computer systems shown in FIG. 1A are connected via network 150, which may use a variety of different networking technologies, including wired, guided or line-of-sight optical, and radio frequency networking. In some embodiments, the network includes the public switched telephone network. Network connections established via the network may be fully-persistent, session-based, or intermittent, such as packet-based. While the facility typically operates in an environment such as is shown in FIG. 1A and described above, those skilled in the art will appreciate the facility may also operate in a wide variety of other environments.

Figure 2:
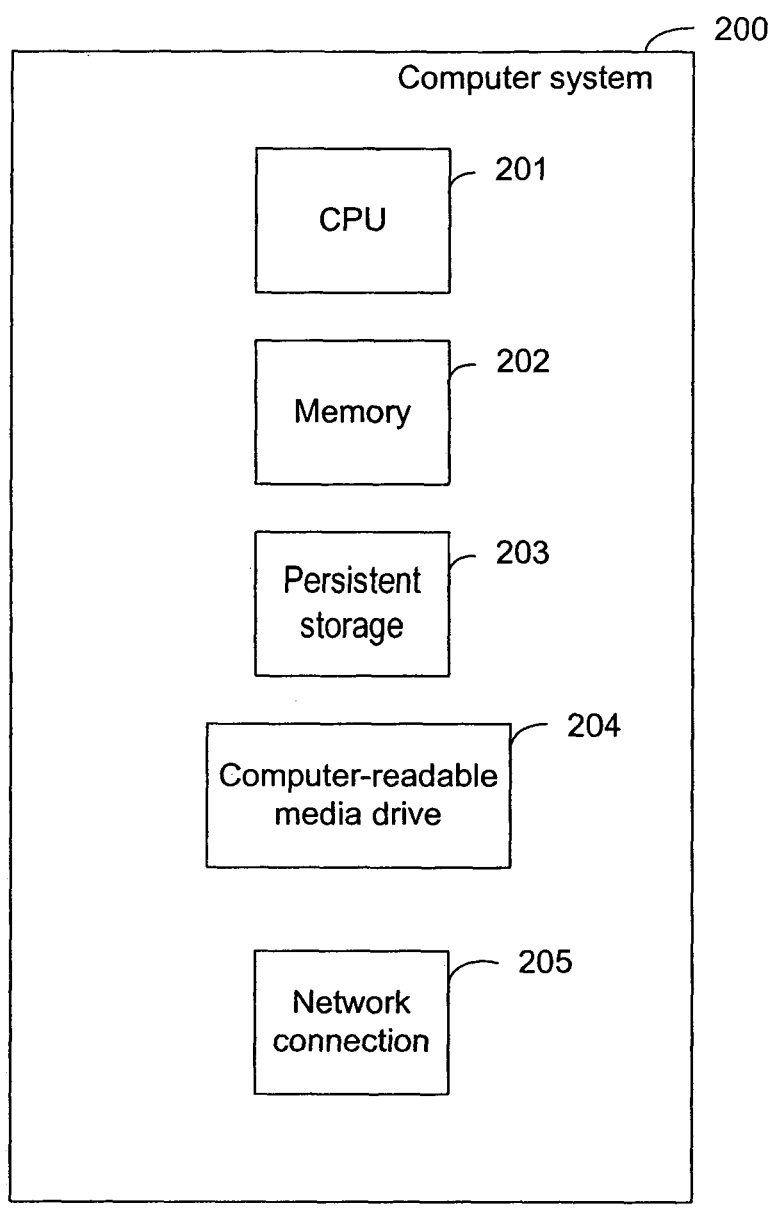
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes, including some or all of the server and client computer systems shown in FIG. 1A. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 204, such as a CD-ROM drive, for reading programs and data stored on a computer-readable medium; and a network connection 205 for connecting the computer system to other computer systems, such as via the Internet, to exchange programs and/or data—including data structures. While computer systems configured as described above are typically used to support the operation of the facility, those skilled in the art will appreciate that the facility may be implemented using devices of various types and configurations, and having various components.

It will be understood by those skilled in the art that the facility may transform inventory transaction information from a number of different source systems and from a number of different source software packages to a number of target systems and/or to a number of target software packages.

FIG. 1B is a block diagram that illustrates some business components of a front-office inventory system 132. According to certain embodiments, such business components include a central distributing warehouse 152, a multiplicity of field offices 154, 156, a plurality of trunks, such as trunk 158, and one or more call centers, such as call center 160. Such business components in front-office inventory system 132 use and store inventory transaction data in the front-office system format. Further, one of the primary functions of front-office inventory system 132 is to serve and interface with customers 162.

Figure 3A:
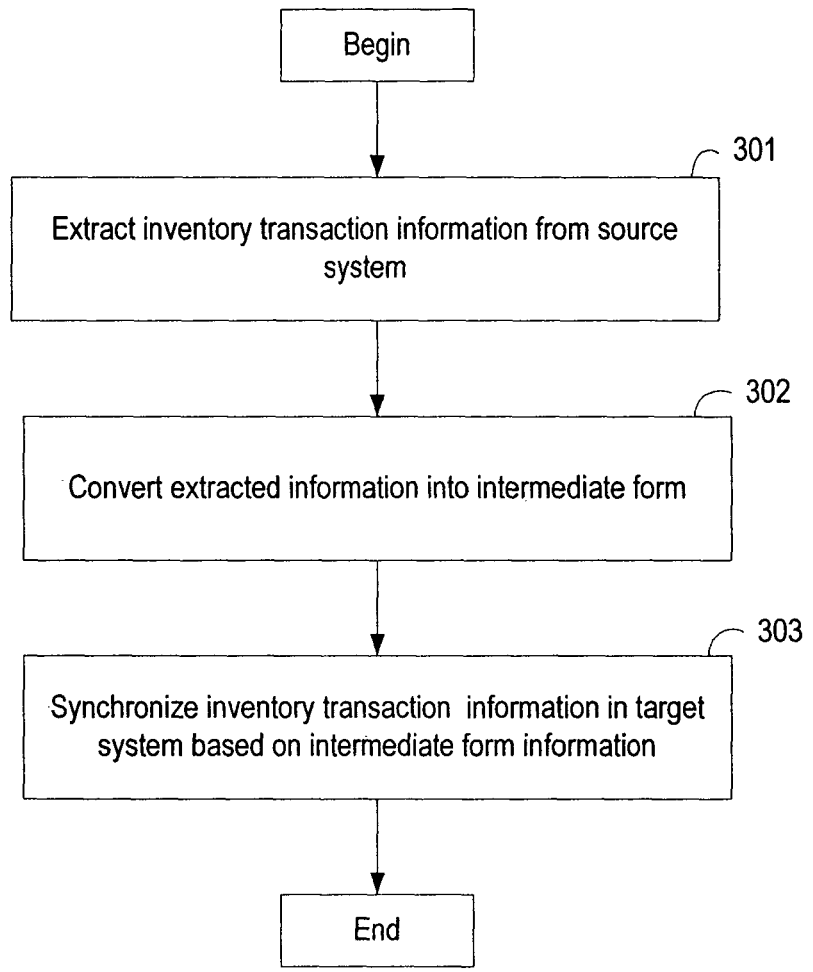
FIG. 3A is a high level flow diagram that shows some steps performed by the facility.

FIG. 3A is a high level flow diagram that shows some steps typically performed by the facility in order to convert inventory transaction information from the one or more source formats to the target format. At block 301, the facility extracts inventory transaction information from one or more source systems. At block 302, the facility converts the extracted information into an intermediate format. The intermediate format is described in greater detail herein, with reference to the common object data model. At block 303, the facility synchronizes the inventory transaction information from the source system with that of the target system by converting the inventory transaction information in intermediate format into the target format. After block 303, the steps as shown in FIG. 3A conclude.

Figure 3B:
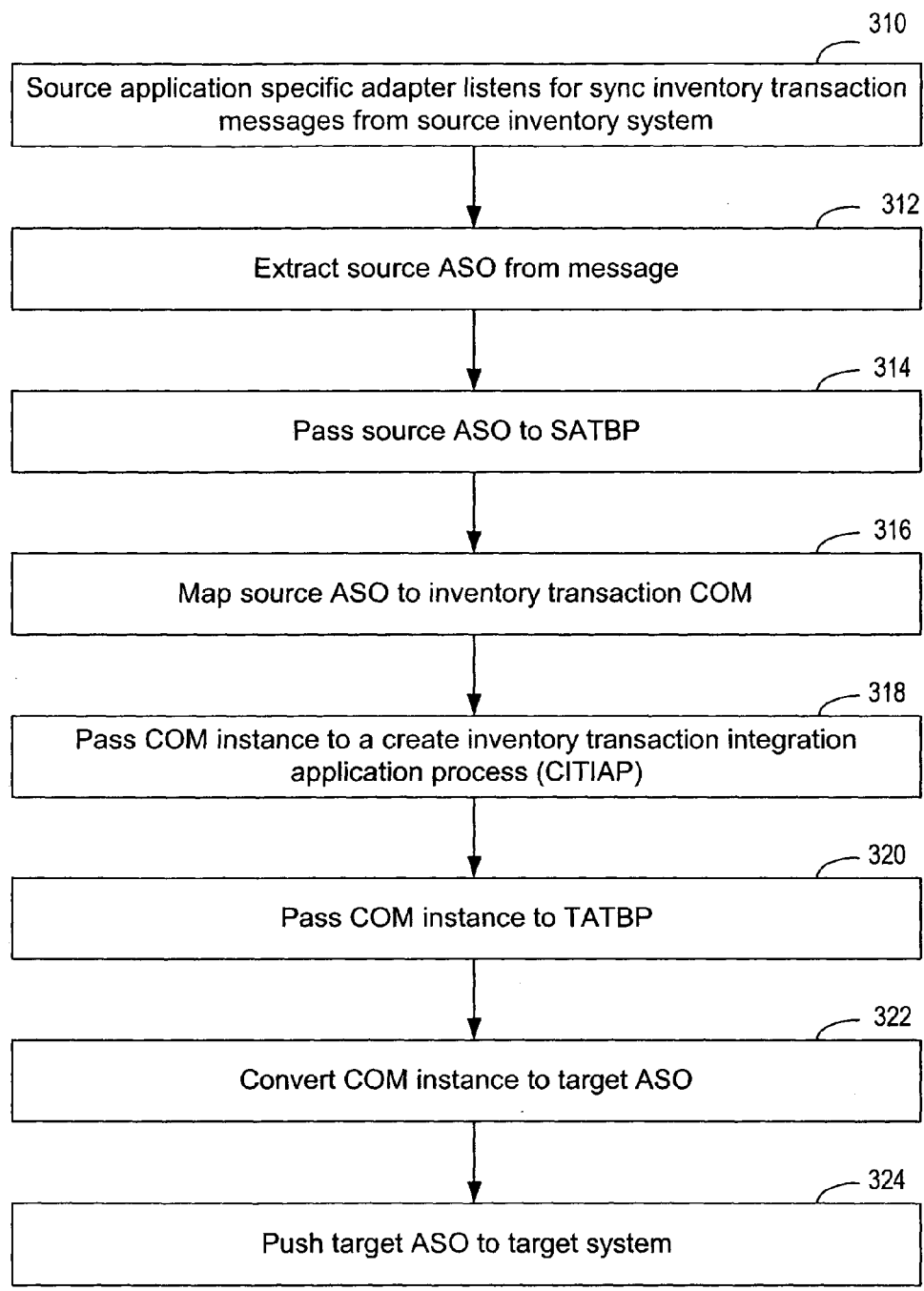
FIG. 3B is a flow diagram that illustrates further aspects of data integration operation, according to certain embodiments.

FIG. 3B is a flow chart that illustrates further aspects of the data integration operation, according to certain embodiments. Because the passage of inventory transaction information can be bi-directional, the back-office inventory system is referred to as the source system and the front-office inventory system is referred to as the target system when inventory transaction information is passed from the back-office system to the front-office system. However, when inventory transaction information is passed from the front-office system to the back-office system, then the front-office system is referred to as the source system and the back-office system is referred to as the target system.

In FIG. 3B, at block 310, a source application specific adapter listens for the "create" inventory transaction messages from a source application program in the source system. According to certain embodiments, the source system is configured with a triggering mechanism that sends a message to the integration server when the inventory transformation information is created in the source system. At block 312, a source application specific object (source ASO) that is associated with the message is extracted. At block 314, the source application specific adapter passes the source ASO to a source application transformation business process (SATBP) across an application specific interface (ASI). At block 316, the SATBP maps the source ASO to the inventory transaction common object model (COM) to create a corresponding inventory transaction COM instance. At block 318, the inventory transaction COM instance is passed to the Create Inventory Transaction Integration Application Process (CITIAP), via the common service interface (CSI). At block 320, the CITIAP passes the inventory transaction COM instance to the target application transformation business process (TATBP), via CSI. At block 320, the TATBP transforms inventory transaction COM instance to the target system's application specific object (target ASO). In other words, in the case where the source system is the back-office system, then the COM instance is converted into a message that is associated with the integration system, such as a multi-application integration system (MAIS), for pushing to the front-office system. In the case where the source system is the front-office system, then the COM instance is converted into a suitable message that can be pushed to the back-office system. At block 322, the TATBP invokes the target application specific adapter via the ASI to push the inventory transaction information (message) into the target system. According to certain embodiments, inventory location information and product information may need to be extracted from the inventory transaction information for purposes of pushing the inventory transaction information into the target system. At block 324, the TATBP again invokes the target application specific adapter via the ASI to commit the inventory transaction into the target system. Thus, the inventory transaction information in the target system is synchronized with that of the source system.

The Create Inventory Transaction is the process of replicating an Inventory Transaction from the source system into the target system. In the scenario going from the back-office to the front-office, the Create Inventory Transaction IAP requests an asynchronous creation of an inventory transaction and does not expect a synchronous response. In the scenario going from the front-office to the back-office, for movement/adjustment/miscellaneous inventory transactions, the Create Inventory Transaction IAP requests synchronous creation of an inventory transaction.

Create means that once a transaction is created in the target system, it is committed and may not be updated. Once committed, the transaction updates the balance in the inventory location master for the bucket that is targeted and for the product that is being transacted. If the user tries to create an Inventory Transaction that already exists in the target system, the Create Inventory Transaction IAP will simply error out.

FIG. 4 to FIG. 21 are data structures of the inventory common object model associated with inventory transactions. Such an inventory common object model illustrates sample intermediate data structures produced from corresponding inventory transaction information in the source format.

Figure 4:
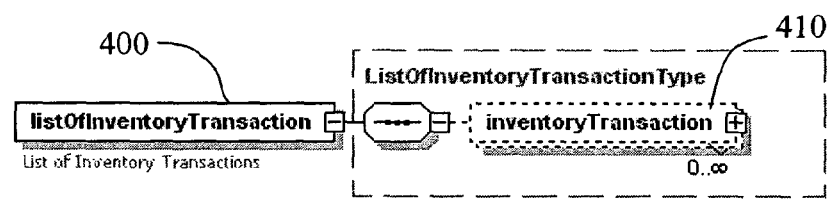
FIG. 4 to FIG. 21 are data structure diagrams that illustrate the inventory transaction common object model, according to certain embodiments.

In FIG. 4, the intermediate data structure 400 is of type listOfInventoryTransaction, which may contain any number of inventoryTransaction data structures 410. One such illustrated inventoryTransaction data structure 500 is shown in FIG. 5.

Figure 5:
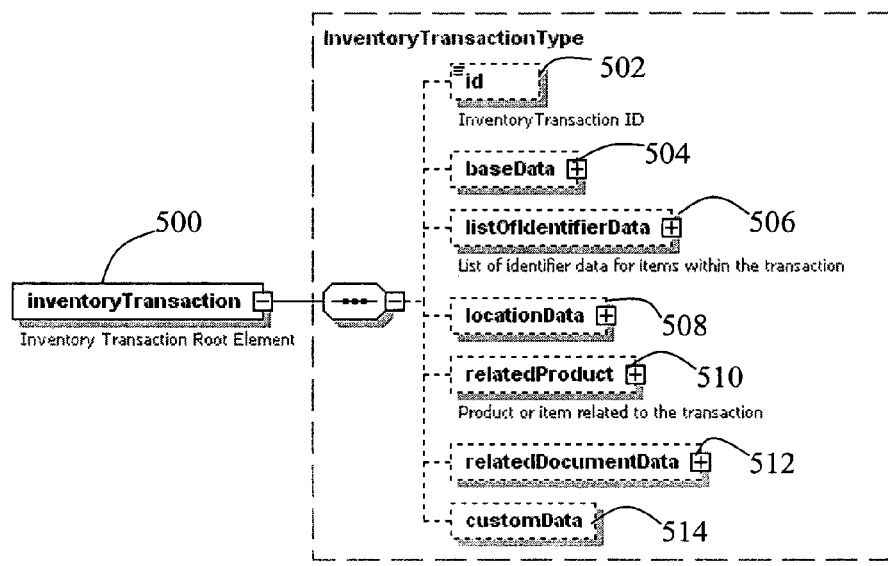

In FIG. 5, inventoryTransaction data structure 500 is the inventory transaction root element and includes an inventory transaction identifier 502 (ID), a baseData section 504, a listOfIdentifierData section 506 (list of identifier data within this particular inventory transaction), a locationData 508, a relatedProduct 510 (product or item related this particular inventory transaction), and a relatedDocumentData 512. In FIG. 5, inventoryTransaction data structure 500 may also include various other information such as various inventory transaction customData 514. The baseData section 504 is discussed in greater detail herein with reference to FIG. 6. The listOfIdentifierData section 506 is discussed in greater detail herein with reference to FIG. 7. The locationData 508 is discussed in greater detail herein with reference to FIG. 8. The relatedProduct 510 is discussed in greater detail herein with reference to FIG. 9. The relatedDocumentData 512 is discussed in greater detail herein with reference to FIG. 10.

Figure 6:
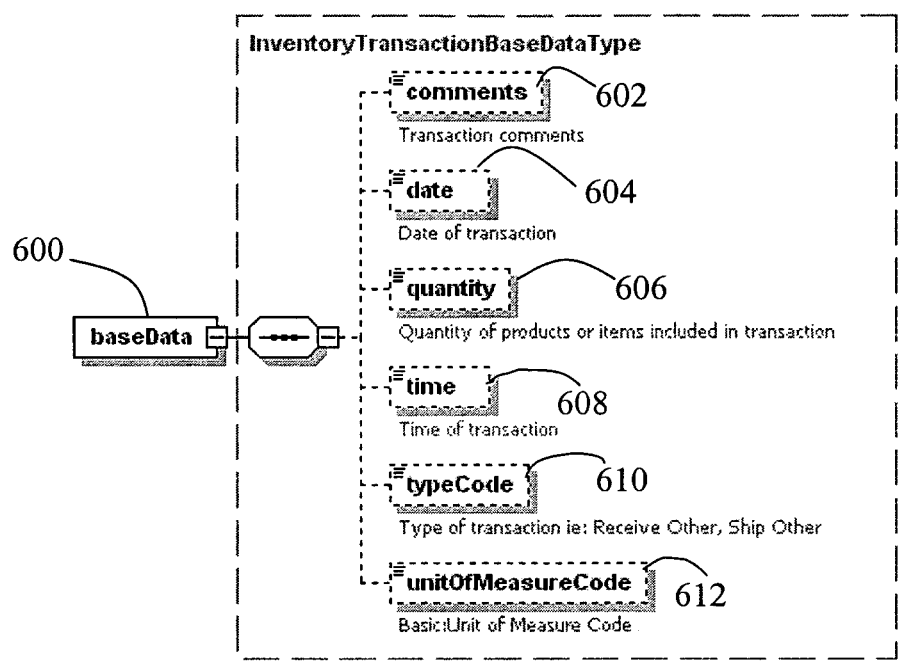

FIG. 6 illustrates the baseData section. In FIG. 6, the baseData section 600 includes transaction Comments 602, a transaction Date 604, a Quantity 606 (quantity of products or items included in the transaction), a transaction Time 608, a type-Code 610, which is the type of transaction, i.e., "Receive Other", "Ship Other", etc., and a unitOfMeasureCode 612 ( basic unit of measure code).

Figure 7:
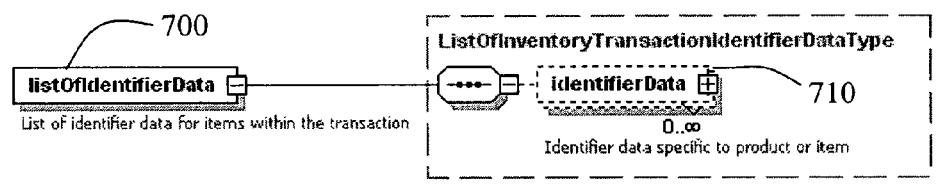

FIG. 7 illustrates the listOfIdentifierData section, which is a list of identifier data for items within the particular inventory transaction. In FIG. 7, the listOfIdentifierData section 700 includes any number of identifierData 710, which are identifier data specific to a product or item.

Figure 8:
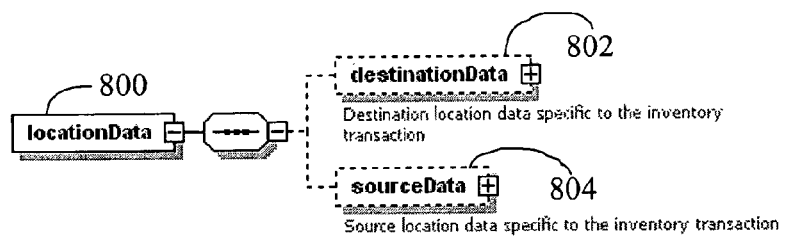

FIG. 8 illustrates the locationData section. In FIG. 8, the locationData section 800 includes destinationData 802 and sourceData 804. The destinationData 802 is the destination location data specific to the particular inventory transaction. The sourceData 804 is the source location data specific to the particular inventory transaction.

Figure 9:
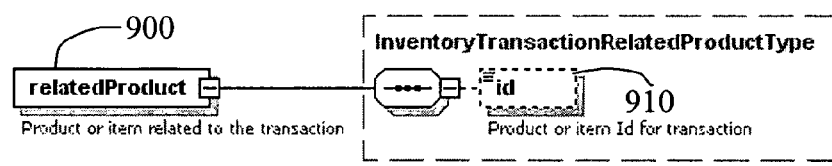

FIG. 9 illustrates the relatedProduct section, which is the product or item related to the particular inventory transaction. In FIG. 9, the relatedProduct section 900 includes a product or item identifier (ID) 910 for the inventory transaction.

Figure 10:
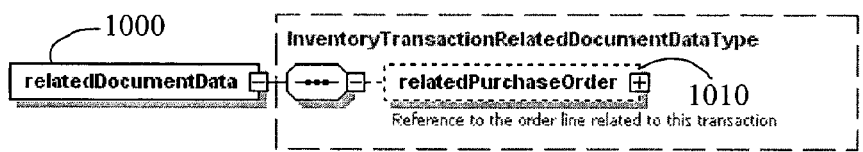

FIG. 10 illustrates the relatedDocumentData section. In FIG. 10, the relatedDocumentData section 1000 includes a relatedPurchaseOrder 1010, which is a reference to the order line related to the particular inventory transaction.

Figure 11:
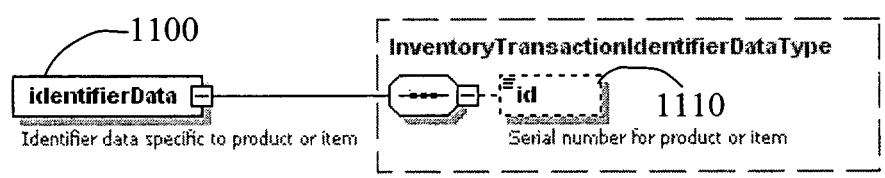

FIG. 11 illustrates the identifierData section, which is the identifier data specific to the product or item. In FIG. 11, the identifierData section 1100 includes a serial number for product or item (ID) 1110.

Figure 12:
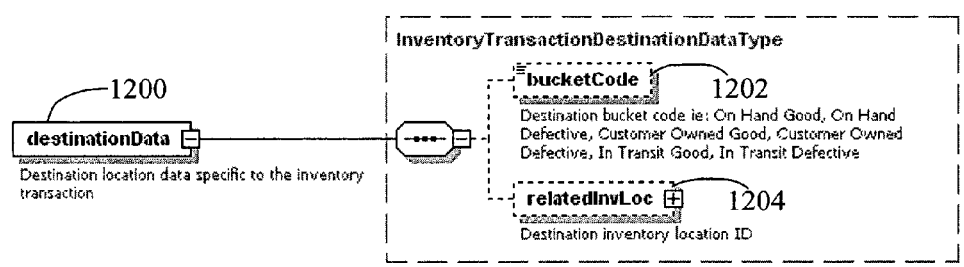

FIG. 12 illustrates the destinationData section, which is the destination location data specific to the particular inventory transaction. In FIG. 12, the destinationData section 1200 includes a destination bucketCode 1202 and a destination relatedInvLoc 1204. The destination bucketCode 1202 is a destination bucket code, such as "On Hand Good", "On Hand Defective", "Customer Owned Good", "Customer Owned Defective", "In Transit Good", and "In Transit Defective." The destination relatedInvLoc 1204 is a destination inventory location identifier.

Figure 13:
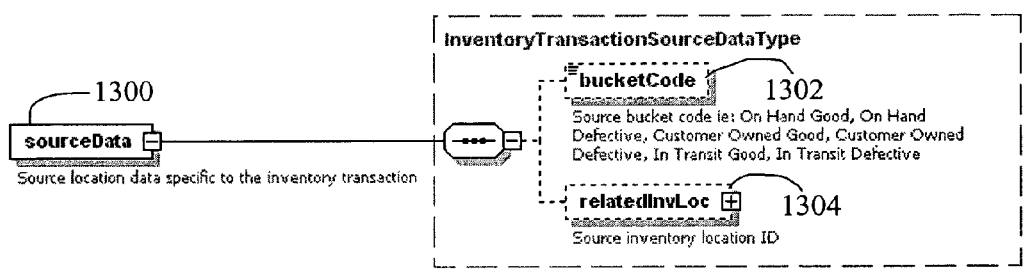

FIG. 13 illustrates the sourceData section, which is the source location data specific to the particular inventory transaction. In FIG. 13, the sourceData section 1300 includes a source bucketCode 1302 and a source relatedInvLoc 1304. The source bucketCode 1302 is a source bucket code, such as "On Hand Good", "On Hand Defective", "Customer Owned Good", "Customer Owned Defective", "In Transit Good", and "In Transit Defective." The source relatedInvLoc 1304 is a source inventory location identifier.

Figure 14:
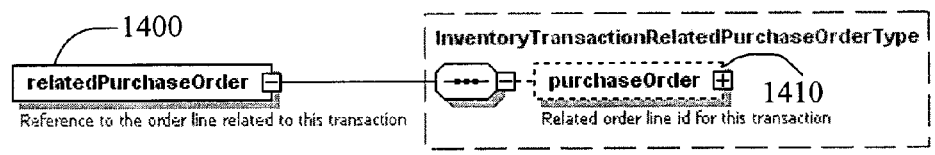

FIG. 14 illustrates the relatedPurchaseOrder section, which is a reference to the order line related to the particular inventory transaction. In FIG. 14, the relatedPurchaseOrder section 1400 includes purchaseOrder 1410, which is the related order line identifier.

Figure 15:
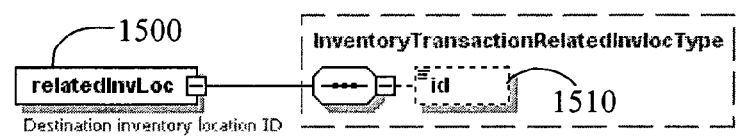

FIG. 15 illustrates the destination relatedInvLoc section, which is the destination inventory location identifier. In FIG. 15, the destination relatedInvLoc section 1500 includes a destination inventory location ID number 1510.

Figure 16:
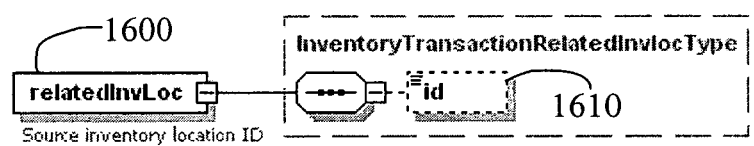

FIG. 16 illustrates the source relatedInvLoc section, which is the source inventory location identifier. In FIG. 16, the source relatedInvLoc section 1600 includes a source inventory location ID number 1610.

Figure 17:
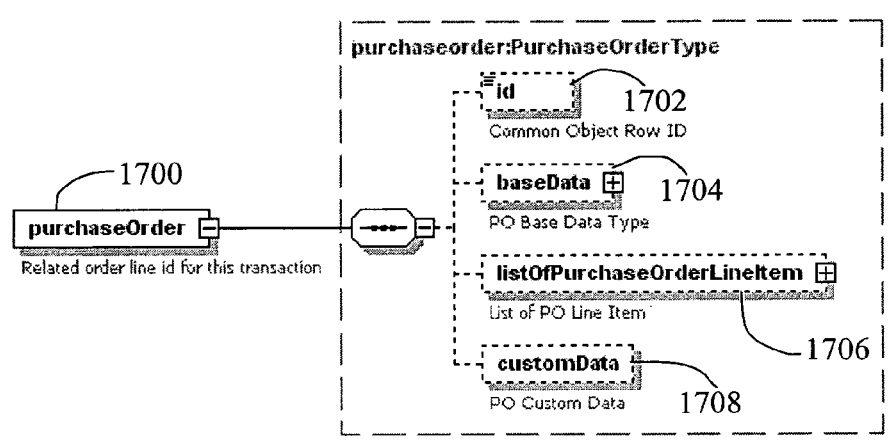

FIG. 17 illustrates the purchaseOrder section, which is the related order line identifier for the particular inventory transaction. In FIG. 17, the purchaseOrder section 1700 includes a common object row ID 1702, a purchase order baseData 1704, a listOfPurchaseOrderLineItem 1706 (a list of purchase order line item), and a purchase order customData 1708 (purchase order custom data).

Figure 18:
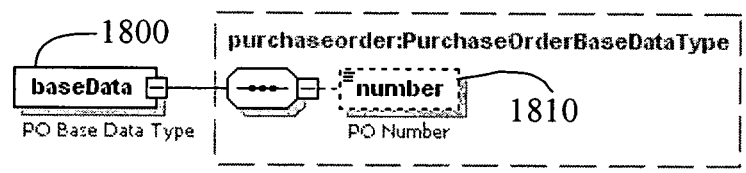

FIG. 18 illustrates the purchase order baseData section. In FIG. 18, the purchase order baseData section 1800 includes a purchase order Number 1810.

Figure 19:
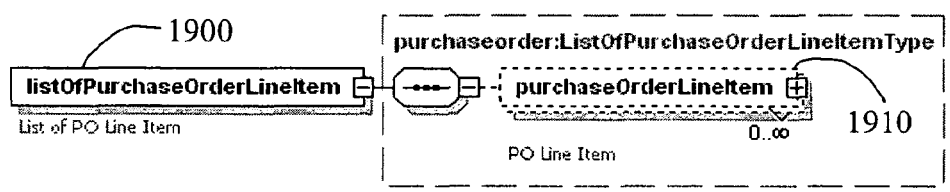

FIG. 19 illustrates the listOfPurchaseOrderLineItem section, which is a list of purchase order line items. In FIG. 19, the listOfPurchaseOrderLineItem section 1900 includes any number of purchaseOrderLineItem 1910 (purchase order line items).

Figure 20:
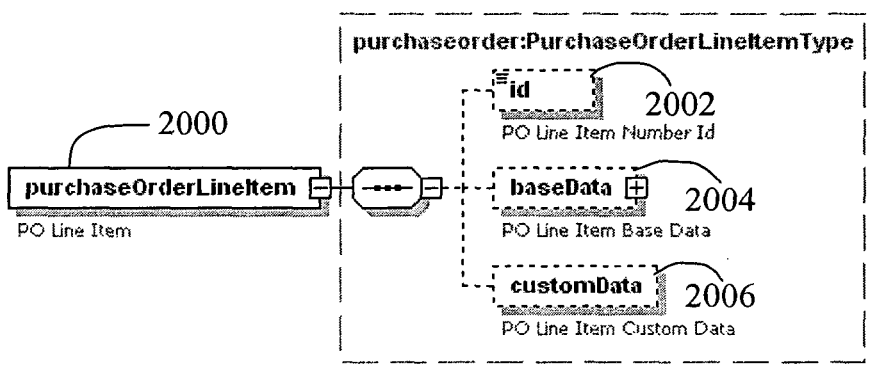

FIG. 20 illustrates the purchaseOrderLineItem section, which is the purchase order line item. In FIG. 20, the purchaseOrderLineItem section 2000 includes a purchase order line item number ID 2002, a purchase order line item baseData 2004, and a purchase order line item customData 2006 (purchase order line item custom data).

Figure 21:
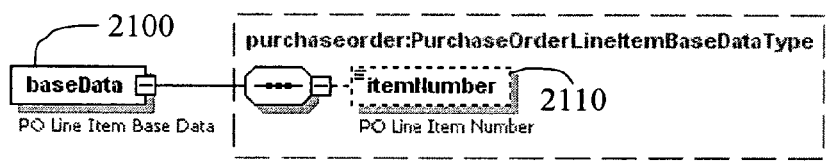

FIG. 21 illustrates the purchase order line item baseData section. In FIG. 21, the purchase order line item baseData section 2100 includes a purchase order line item Number 2110.

It will be appreciated by those skilled in the art that the above-described facility may be straightforwardly adapted or extended in various ways. For example, the facility may be used to transform various other kinds of inventory transaction information, and may be used to transform inventory transaction information between a variety of other formats.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any express definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A computer-implemented method comprising:
 synchronizing inventory transaction information within a computerized inventory management system, wherein
  the computerized inventory management system comprises
   a plurality of computer systems, and
   an integration server,
  the computer systems are configured to communicate with the integration server via a network,
  each of the computer systems is configured with at least one corresponding inventory system of a plurality of inventory systems,
  the synchronizing is performed in response to a source inventory transaction,
  the synchronizing is performed between any plurality of the plurality of inventory systems, and
  the synchronizing comprises
   extracting inventory transaction information in a source format, wherein
    the inventory transaction information comprises source inventory transaction information,
    the source format is associated with a source inventory system,
    the source inventory system is one of the plurality of inventory systems, and
    the source inventory transaction is executable by the source inventory system, at least in part, by virtue of the inventory transaction information in the source format being in the source format, converting, at the integration server, the inventory transaction information in the source format into inventory transaction information in an intermediate format, converting, at the integration server, the inventory transaction information in the intermediate format into inventory transaction information in a target format, wherein
the target format corresponds to a target inventory system, and
the target inventory system is another of the plurality of inventory systems, pushing the inventory transaction information in the target format to the target inventory system, and generating a target inventory transaction in the target inventory system, wherein
the generating the target inventory transaction comprises
determining whether the target inventory transaction is appropriate to the target inventory system, wherein the determining is based, at least in part, on
whether the target inventory transaction is executable by the target inventory system, and whether executing the target inventory transaction on the target inventory system accomplishes a result on the target inventory system equivalent to a result on the source inventory system accomplished by executing the source inventory transaction on the source inventory system, and
if the target inventory transaction is executable by the target inventory system, the target inventory transaction is executable by the target inventory system, at least in part, by virtue of the inventory transaction information in the target format being in the target format.

2. The computer-implemented method of claim 1, further comprising:
using the inventory transaction information in the target format to perform at least one computer-implemented act from a set of computer-implemented acts comprising:
creating a new inventory transaction record in the target inventory system; and
updating an existing inventory transaction record in the target inventory system.

3. The computer-implemented method of claim 1, further comprising:
extracting inventory transaction information in a second source format that is associated with a second source inventory system that is distinct from the source inventory system, wherein
the second source inventory system is another of the inventory systems;
converting the inventory transaction information in the second source format into inventory transaction information that is in the intermediate format;
converting the inventory transaction information in the intermediate format into inventory transaction information in the target format; and
using the inventory transaction information in the target format to perform at least one computer-implemented act from a set of computer-implemented acts comprising:

creating a new inventory transaction record in the target inventory system; and
updating an existing inventory transaction record in the target inventory system.

4. The computer-implemented method of claim 1, wherein the intermediate format comprises a list of inventory transactions class with a hierarchy of data elements, wherein the hierarchy of data elements comprises a plurality of inventory transaction elements which comprise other elements.

5. The computer-implemented method of claim 4, wherein each of the plurality of inventory transaction elements comprises:
an inventory transaction identifier;
a base data element for defining:
a transaction comments element;
a transaction date;
a transaction quantity of items;
a transaction time;
a transaction type code; and
a transaction unit of measure code;
a list of identifier data element for defining identifier data that is specific to a product or item;
a location data element for defining a destination location data element and a source location data element;
a related product element for defining a product or item identifier;
a related document data element for defining a related purchase order element; and
a custom data element for defining customized attributes for the inventory transaction information.

6. The computer-implemented method of claim 5, wherein:
the identifier data element comprises a product serial number or an item serial number;
the destination location data element comprises a destination bucket code element and a destination inventory location identifier element;
the source location data element comprises a source bucket code element and a source inventory location identifier; and
the related purchase order element comprises a purchase order element for defining purchase-order-type elements that comprise:
a common object row identifier element;
a purchase order base data element wherein the purchase order base data element comprises a purchase order number;
a list of purchase order line item element, wherein the list of purchase order line item element comprises a plurality of purchase order line items; and
a purchase order custom data element.

7. The computer-implemented method of claim 6, wherein each of the plurality of purchase order line items comprises:
a purchase order line item number identifier element;
a purchase order line item base data element; and
a purchase order line item custom data element.

8. The computer-implemented method of claim 7, wherein the purchase order line item base data element comprises a purchase order line item number.

9. A non-transitory computer-readable medium carrying one or more sequences of instructions for managing inventory, wherein execution of the one or more sequences of instructions by one or more processors causes the one or more processors to perform:
synchronizing inventory transaction information within a computerized inventory management system, wherein the computerized inventory management system comprises a plurality of computer systems, and
an integration server,
the computer systems are configured to communicate with the integration server via a network,
each of the computer systems is configured with at least one corresponding inventory system of a plurality of inventory systems,
the synchronizing is performed in response to a source inventory transaction,
the synchronizing is performed between any plurality of the plurality of inventory systems, and
the synchronizing comprises
extracting inventory transaction information in a source format,
wherein
the inventory transaction information comprises source inventory transaction information,
the source format is associated with a source inventory system,
the source inventory system is one of the plurality of inventory systems, and
the source inventory transaction is executable by the source inventory system, at least in part, by virtue of the inventory transaction information in the source format being in the source format,
converting, at the integration server, the inventory transaction information in the source format into inventory transaction information in an intermediate format,
converting, at the integration server, the inventory transaction information in the intermediate format into inventory transaction information in a target format, wherein
the target format corresponds to a target inventory system, and
the target inventory system is another of the plurality of inventory systems,
pushing the inventory transaction information in the target format to the target inventory system, and
generating a target inventory transaction in the target inventory system, wherein
the generating the target inventory transaction comprises
determining whether the target inventory transaction is appropriate to the target inventory system, wherein
the determining is based, at least in part, on whether the target inventory transaction is executable by the target inventory system, and
whether executing the target inventory transaction on the target inventory system accomplishes a result on the target inventory system equivalent to a result on the source inventory system accomplished by executing the source inventory transaction on the source inventory system, and
if the target inventory transaction is executable by the target inventory system, the target inventory transaction is executable by the target inventory system, at least in Dart, by virtue of the inventory transaction information in the target format being in the target format.

10. The non-transitory computer-readable medium of claim 9, further comprising:
using the inventory transaction information in the target format to perform at least one computer-implemented act from a set of computer-implemented acts comprising:
creating a new inventory transaction record in the target inventory system; and
updating an existing inventory transaction record in the target inventory system.

11. The non-transitory computer-readable medium of claim 9, further comprising:
extracting inventory transaction information in a second source format that is associated with a second source inventory system that is distinct from the source inventory system, wherein
the second source inventory system is another of the inventory systems;
converting the inventory transaction information in the second source format into inventory transaction information that is in the intermediate format;
converting the inventory transaction information in the intermediate format into inventory transaction information in the target format; and
using the inventory transaction information in the target format to perform at least one computer-implemented act from a set of computer-implemented acts comprising:
creating a new inventory transaction record in the target inventory system; and
updating an existing inventory transaction record in the target inventory system.

12. The non-transitory computer-readable medium of claim 9, wherein the intermediate format comprises a list of inventory transactions class with a hierarchy of data elements.

13. The non-transitory computer-readable medium of claim 12, wherein the hierarchy of data elements comprises a plurality of inventory transaction elements which comprise other elements.

14. The non-transitory computer-readable medium of claim 13, wherein each of the plurality of inventory transaction elements comprises an inventory transaction identifier.

15. The non-transitory computer-readable medium of claim 13, wherein each of the plurality of inventory transaction elements comprises a base data element for defining:
a transaction comments element;
a transaction date;
a transaction quantity of items;
a transaction time;
a transaction type code; and
a transaction unit of measure code.

16. The non-transitory computer-readable medium of claim 13, wherein each of the plurality of inventory transaction elements comprises a list of identifier data element for defining identifier data that is specific to a product or item.

17. The non-transitory computer-readable medium of claim 16, wherein the identifier data element comprises a product serial number or an item serial number.

18. The non-transitory computer-readable medium of claim 13, wherein each of the plurality of inventory transaction elements comprises a location data element for defining a destination location data element and a source location data element.

19. The non-transitory, computer-readable medium of claim 18, wherein the destination location data element comprises a destination bucket code element, which in turn comprises a destination inventory location identifier.

20. The non-transitory computer-readable medium of claim 18, wherein the source location data element comprises a source bucket code element, which in turn comprises a source inventory location identifier.

21. The non-transitory computer-readable medium of claim 13, wherein each of the plurality of inventory transaction elements comprises a related product element for defining a product or item identifier.

22. The non-transitory computer-readable medium of claim 13, wherein each of the plurality of inventory transaction elements comprises a related document data element for defining a related purchase order element.

23. The non-transitory computer-readable medium of claim 22, wherein the related purchase order element comprises a purchase order element for defining purchase order elements that comprise:
   a common object row identifier element;
   a purchase order base data type element;
   a list of purchase order line item element; and
   a purchase order custom data element.

24. The non-transitory computer-readable medium of claim 23, wherein the purchase order base data type element comprises a purchase order number.

25. The non-transitory computer-readable medium of claim 23, wherein the list of purchase order line item element comprises a plurality of purchase order line items.

26. The non-transitory computer-readable medium of claim 25, wherein each of the plurality of purchase order line items comprises:
   a purchase order line item number identifier element;
   a purchase order line item base data element; and
   a purchase order line item custom data element.

27. The non-transitory computer-readable medium of claim 26, wherein the purchase order line item base data element comprises a purchase order line item number.

28. The non-transitory computer-readable medium of claim 13, wherein each of the plurality of inventory transaction elements comprises a custom data element for defining customized attributes for the inventory transaction information.

29. A computerized inventory management system, comprising:
   an integration server comprising
      a processor, and
      a computer-readable storage medium,
   the integration server is configured to communicate to a plurality of computer systems via a network,
   each of the computer systems is configured with at least one corresponding inventory system of a plurality of inventory systems,
   the computer-readable storage medium comprises
      instructions, when executed by the processor, for synchronizing inventory transaction information within the computerized inventory management system, wherein
         the instructions for synchronizing are configured to perform in response to a source inventory transaction, wherein
            the synchronizing is performed between any plurality of the plurality of inventory systems, and
         the instructions for synchronizing comprise
            instructions, when executed by the processor, for extracting inventory information in a source format, wherein
               the inventory transaction information comprises source inventory transaction information,
               the source format is associated with a source inventory system,
               the source inventory system is one of the plurality of inventory systems, and
               the source inventory transaction is executable by the source inventory system, at least in part, by virtue of the inventory transaction information in the source format being in the source format,
            instructions, when executed by the processor, for converting the inventory transaction information in the source format into inventory transaction information in intermediate format,
            instructions, when executed by the processor, for converting the inventory transaction information in the intermediate format into inventory transaction information in a target format, wherein
               the target format corresponds to a target inventory system, and
               the target inventory system is another of the plurality of inventory systems,
            instructions, when executed by the processor, for pushing the inventory transaction information in the target format to the target inventory system, and
            instructions, when executed by the processor, for generating a target inventory transaction in the target inventory system, wherein
               the generating the target inventory transaction comprises
                  determining whether the target inventory transaction is appropriate to the target inventory system, wherein
                     the determining is based, at least in part, on whether the target inventory transaction is executable by the target inventory system, and whether executing the target inventory transaction on the target inventory system accomplishes a result on the target inventory system equivalent to a result on the source inventory system accomplished by executing the source inventory transaction on the source inventory system, and
                  if the target inventory transaction is executable by the target inventory system, the target inventory transaction is executable by the target inventory system, at least in part, by virtue of the inventory transaction information in the target format being in the target format.

30. The data structure of claim 29, wherein each of the plurality of inventory transaction elements comprises:
   an inventory transaction identifier;
   a base data element for defining:
      a transaction comments element;
      a transaction date;
      a transaction quantity of items;
      a transaction time;
      a transaction type code; and
      a transaction unit of measure code;
   a list of identifier data element for defining identifier data that is specific to a product or item;
   a location data element for defining a destination location data element and a source location data element;
   a related product element for defining a product or item identifier;
   a related document data element for defining a related purchase order element; and
   a custom data element for defining customized attributes for the inventory transaction information.

31. The data structure of claim 30, wherein:
   the identifier data element comprises a product serial number or an item serial number;

the destination location data element comprises a destination bucket code element and a destination inventory location identifier element;

the source location data element comprises a source bucket code element and a source inventory location identifier; and the related purchase order element comprises a purchase order element for defining purchase-order-type elements that comprise:
- a common object row identifier element;
- a purchase order base data element wherein the purchase order base data element comprises a purchase order number;
- a list of purchase order line item element, wherein the list of purchase order line item element comprises a plurality of purchase order line items; and
- a purchase order custom data element.

32. The data structure of claim 31, wherein each of the plurality of purchase order line items comprises:
- a purchase order line item number identifier element;
- a purchase order line item base data element; and
- a purchase order line item custom data element.

33. The data structure of claim 32, wherein the purchase order line item base data element comprises a purchase order line item number.

* * * * *

UNITED STATES PATENT AND TRADEMARK OFFICE
CERTIFICATE OF CORRECTION

PATENT NO.         : 8,510,179 B2
APPLICATION NO.    : 10/696371
DATED              : August 13, 2013
INVENTOR(S)        : Kahlon et al.

It is certified that error appears in the above-identified patent and that said Letters Patent is hereby corrected as shown below:

On Title page 2, column 2, Item (56) under other publications, line 4, delete "&imagekey" and insert -- &_imagekey --, therefor.

On Title page 3, column 1, Item (56) under other publications, line 14, delete "entriched ifnormation" and insert -- enriched information --, therefor.

On Title page 3, column 1, Item (56) under other publications, line 17, delete "Conventry:" and insert -- Coventry: --, therefor.

In the Claims

In column 15, line 59, in Claim 9, delete "Dart," and insert -- part, --, therefor.

In column 16, line 58, In Claim 19, delete "non-transitory," and insert -- non-transitory --, therefor.

Signed and Sealed this
Twelfth Day of November, 2013

Teresa Stanek Rea
*Deputy Director of the United States Patent and Trademark Office*